(12) United States Patent
Muiter et al.

(10) Patent No.: US 9,381,843 B2
(45) Date of Patent: Jul. 5, 2016

(54) MODULAR CUP HOLDER ASSEMBLY

(71) Applicant: Ford Global Technologies, LLC, Dearborn, MI (US)

(72) Inventors: James Hadley Muiter, Plymouth, MI (US); John Steven Conley, Clinton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 26 days.

(21) Appl. No.: 14/453,673

(22) Filed: Aug. 7, 2014

(65) Prior Publication Data
US 2016/0039324 A1 Feb. 11, 2016

(51) Int. Cl.
*B60N 3/10* (2006.01)
*B60Q 3/02* (2006.01)
*B60R 7/04* (2006.01)

(52) U.S. Cl.
CPC *B60N 3/108* (2013.01); *B60N 3/10* (2013.01); *B60N 3/101* (2013.01); *B60N 3/107* (2013.01); *B60Q 3/0243* (2013.01); *B60R 7/04* (2013.01)

(58) Field of Classification Search
CPC .................................................. B60Q 3/0243
USPC ........................................ 362/488, 154, 101
See application file for complete search history.

(56) References Cited

U.S. PATENT DOCUMENTS

| 5,822,023 | A | * | 10/1998 | Suman | B60R 7/04 348/837 |
| 5,915,832 | A | * | 6/1999 | Baird, Sr. | A47G 23/0216 362/101 |
| 6,234,439 | B1 | | 5/2001 | Townsend et al. | |
| 6,305,817 | B1 | | 10/2001 | Johnston et al. | |
| 6,896,387 | B2 | | 5/2005 | Renfro | |
| 7,500,443 | B1 | | 3/2009 | Allen | |
| 7,766,293 | B2 | | 8/2010 | Seidl et al. | |
| 8,353,604 | B2 | | 1/2013 | Glazier et al. | |
| 8,485,680 | B2 | | 7/2013 | Anderson et al. | |
| 8,585,264 | B2 | | 11/2013 | Robbins | |
| 8,960,944 | B2 | * | 2/2015 | Foo | A47G 23/0216 362/154 |
| 2004/0233661 | A1 | * | 11/2004 | Taylor | A47G 19/2227 362/101 |
| 2006/0097121 | A1 | * | 5/2006 | Fugate | A47G 23/0309 248/311.2 |
| 2007/0139943 | A1 | | 6/2007 | Bone et al. | |
| 2008/0266853 | A1 | * | 10/2008 | Goto | B60Q 3/004 362/240 |
| 2011/0037287 | A1 | * | 2/2011 | Penner | B60N 3/101 296/37.8 |
| 2011/0248040 | A1 | * | 10/2011 | McGregor | B65D 21/086 220/666 |
| 2011/0284547 | A1 | * | 11/2011 | McElligott | B65D 21/086 220/495.03 |
| 2012/0075842 | A1 | | 3/2012 | Goto | |
| 2013/0258670 | A1 | | 10/2013 | Abro et al. | |

* cited by examiner

*Primary Examiner* — Laura Tso

(74) *Attorney, Agent, or Firm* — Vichit Chea; Price Heneveld LLP

(57) ABSTRACT

A cup holder assembly includes a first body defining an upper sidewall between a first open end and a second open end and a second body defining a lower sidewall between a third open end and a lower wall. The second body is affixable with the first body in a first position with the lower sidewall extending continuously with the upper sidewall and a second position with a gap defined between the upper sidewall and the lower sidewall.

19 Claims, 4 Drawing Sheets

MODULAR CUP HOLDER ASSEMBLY

FIELD OF THE INVENTION

The present invention generally relates to cup holder assemblies for incorporation into motor vehicle consoles or the like. In particular, a modular assembly includes various components that can be assembled in illuminated and non-illuminated variations.

BACKGROUND OF THE INVENTION

Motor vehicle interiors may include a number of cup holders at various locations accessible to the driver or passengers of the vehicle. For example, a center console of a vehicle may include one or more cup holders for use by the driver or front passenger. For the driver, in particular, the ability to quickly locate a cup holder when placing a cup (or other container) therein, may help reduce distraction or diversion of the driver's attention from the road. For this and for other motivations (e.g. aesthetic or the like), illuminated cup holders have been developed that include a light source within or adjacent to the cup holder that illuminate the cup holder interior and/or a portion of the wall or floor of the cup holder.

Due, at least in part, to the added expense of lighting one or more cup holders within a vehicle, illuminated cup holders are often left as an option for a purchaser of a vehicle or are only included in particular elevated trim levels of a particular mode. Still further, as vehicle manufacturers often share parts among models, various models with similar cup holder structures may include some models with illuminated cup holders and some with non-illuminated cup holders. Illuminated cup holders have previously utilized separate components from non-illuminated cup holders. Accordingly, manufacturers offering non-illuminated cup holders have utilized solutions such as: leaving an unsightly gap where a light source would otherwise be present; adding a unique, non-functional part to fill the gap (sometimes called a "dummy plug"); or, creating separate injection-mold tooling for a unique version of the cup holder that does not include the lighting feature. Accordingly, further advances in cup holder assemblies are desired.

SUMMARY OF THE INVENTION

According to one aspect of the present invention, a cup holder assembly includes a first body defining an upper sidewall between a first open end and a second open end and a second body defining a lower sidewall between a third open end and a lower wall. The second body is affixable with the first body in a first position with the lower sidewall extending continuously with the upper sidewall and a second position with a gap defined between the upper sidewall and the lower sidewall.

According to another aspect of the present invention, a vehicle console includes a substrate and a first cup holder portion defining an upper sidewall between the substrate and a first edge. The vehicle console also includes a second cup holder portion defining a lower sidewall between a second edge and a lower wall. The second cup holder portion is affixable with the first portion in a first position with the second edge contacting the first edge and a second position with a gap defined between the first edge and the second edge.

According to another aspect of the present invention, a modular cup holder system includes a first body defining an upper sidewall between an opening and a first edge and a second body defining a lower sidewall between a second edge and a lower wall. The second body is affixable with the first body in a first position with the second edge contacting the first edge and a second position with a gap defined between the first edge and the second edge. The system also includes an insert positionable within the gap when the second body is assembled with the first body in the second position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
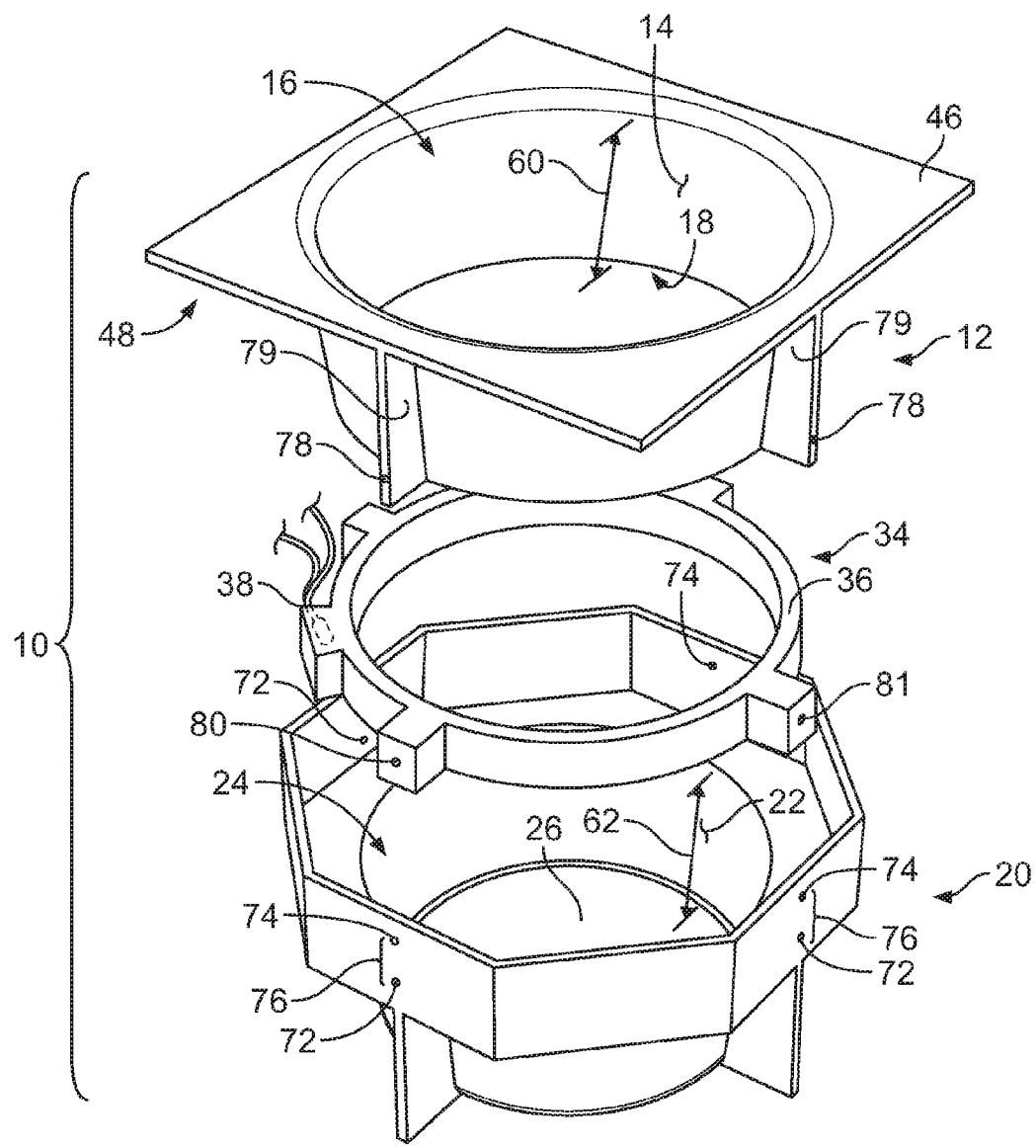
FIG. 1 is an exploded view of a modular cup holder assembly.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Figure 2:
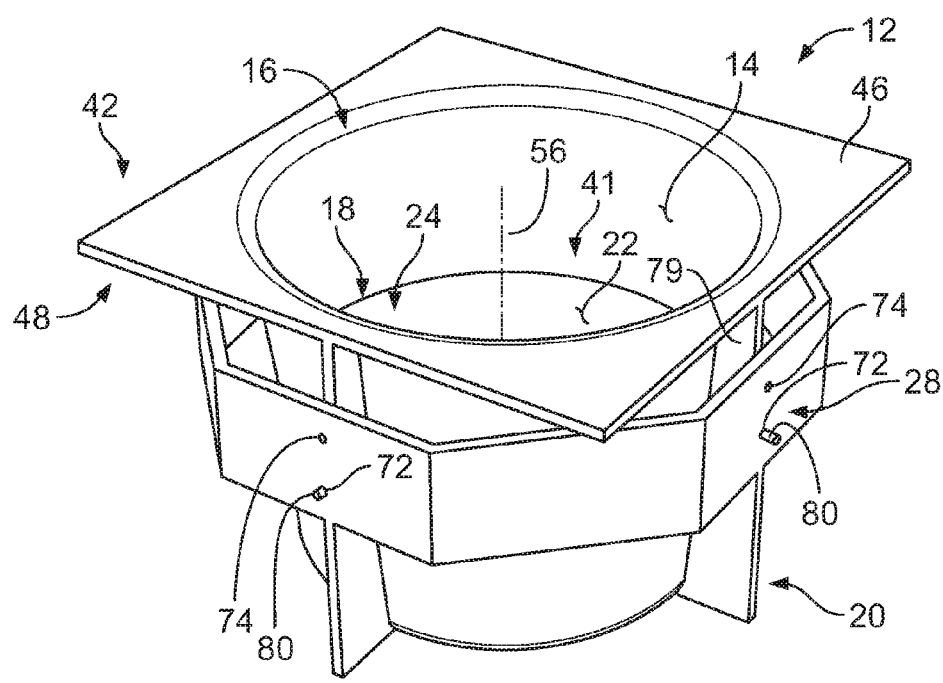
FIG. 2 is a perspective view of the modular cup holder assembly of FIG. 1 in a first assembly variation.
Figure 3:
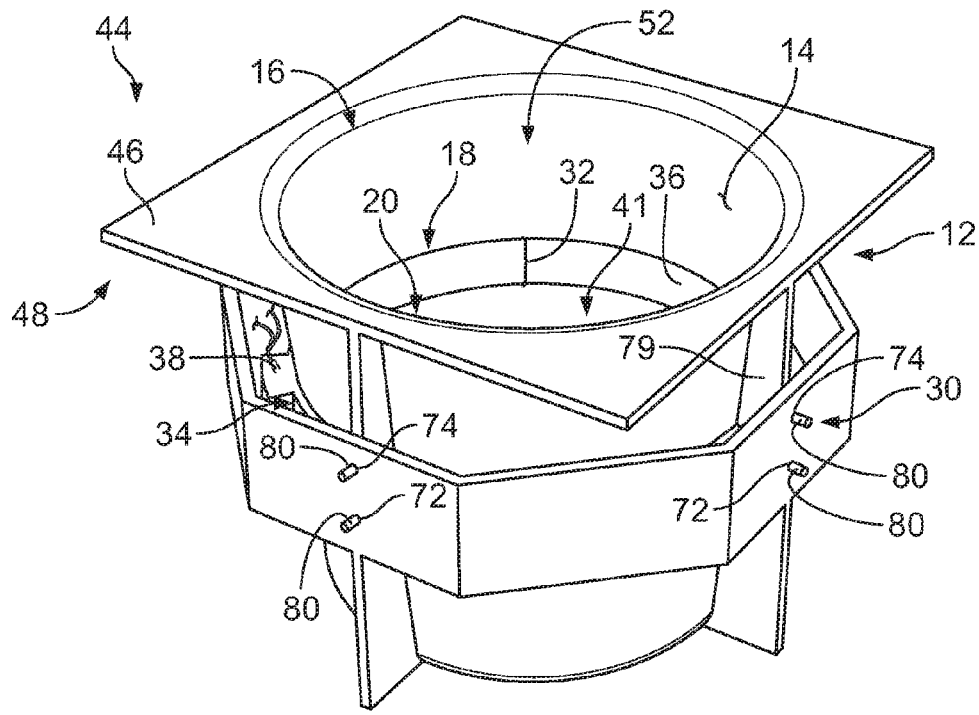
FIG. 3 is a perspective view of the modular cup holder assembly of FIG. 1 in a second assembly variation.

Referring to FIG. 1, reference numeral 10 generally designates a cup holder assembly. The cup holder assembly 10 includes a first body 12 defining an upper side wall 14 between a first open end 16 and a second open end 18. The cup holder assembly 10 also includes a second body 20 defining a lower side wall 22 between a third open end 24 and a lower wall 26. Second body 20 is affixable with the first body 12 in a first position 28 (as shown in FIG. 2) with the lower side wall 22 extending continuously with the upper side wall 14 and a second position 30 (as shown in FIG. 3) with a gap 32 defined between the upper side wall 14 and the lower side wall 22. The cup holder assembly 10 can further include an insert 34 that is positionable within the gap 32 when the second body 20 is assembled with the first body 12 in the second position 30.

Insert 34 can include a body 36 and light source 40. The body 36 may be of an at least partially transparent or translucent material such as various types of transparent or semitransparent plastic or the like. Insert 34 may further be constructed so as to couple with light source 40 (such as by receiving all or a portion of light source 40 within a portion thereof) and form a light path therethrough to a surface thereof (such as surface 38) to disperse light emanating from light source 40 therethrough so as to illuminate at least a portion of insert body 36, such as at least the interior surface 38 thereof. In an example, insert body 36 can be constructed (e.g. by way of the geometry, surface coatings or finishes, or the like) to generally evenly illuminate interior surface 38 thereof and to cast outward illumination therefrom. Further, insert 34 can include a plurality of light sources, such as light source 40, with insert body 36 configured to generally evenly distribute the light from the multiple light sources and to generally blend together such light so that the individual sources are not visible from outside of surface 38.

The above-described illumination distribution characteristics of insert 34, along with the ability to affix second body 20 with first body in either the first position 28 or the second position 30, provides modularity for cup holder assembly 10 such that both a non-illuminated variation 42 (as shown in FIG. 2) and an illuminated variation 44 (as shown in FIG. 3) can be achieved using the same first body 12 and second body 20. In particular, in the non-illuminated variation 42 second body is affixed with first body in the first assembly position 28. Alternatively, the illuminated variation 44 is such that second body 20 is affixed with first body in the second assembly position 30 and insert 34 is positioned within the gap 32, which is present between lower side wall 22 and upper side wall 14. As shown in FIG. 3, in such an illuminated variation 44, inside surface 38 of insert body 36 extends within gap 32 and is generally aligned, as further discussed below, with upper side wall 14 and lower side wall 22 and is open to an interior 41 of assembled illuminated variation 44 such that in the illumination provided by insert 34 is visible within interior 41.

Figure 4:
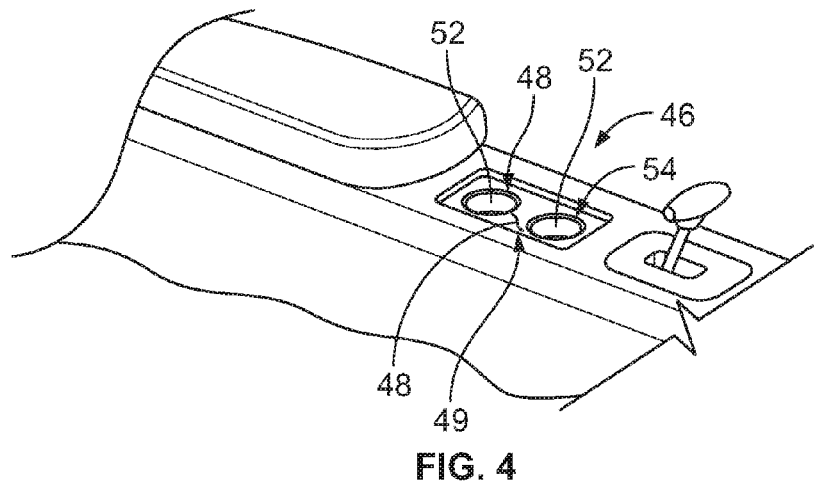
FIG. 4 is a perspective view of a vehicle console including the cup holder assembly of FIG. 1 integrated therewith in either of the first or second assembly variations.

As shown in FIG. 4, one or more cup holder assemblies 10 can be used in a vehicle console 46 to provide a cup holder 52 usable for a driver or passenger of an associated vehicle. In an example, a second cup holder 56 can also be included within the vehicle console 46 that can also be provided using cup holder assembly 10, as discussed herein. In this manner, vehicle console 46 can be provided with one or more cup holders 52 and 56 that may each be illuminated or non-illuminated using generally the same components (i.e. first body 12 and second body 20) assembled together in either the non-illuminated variation 42 or the illuminated variation 44 (which further includes insert 34). As further shown in FIGS. 1 through 4, first body 12 of cup holder assembly 10 can include a substrate portion 48 extending outwardly from upper side wall 14 around the open end 16 thereof. As shown in FIG. 4, substrate portion 48 can extend along a portion of vehicle console 46 so as to define an area of an exterior surface thereof. Such a surface can be integral with a large area of the exterior of vehicle console 46 or within a separately-defined cup holder area 49 along console 46 with an opening 54 to the respective cup holder 52 or 56 being defined at the intersection between the substrate portion 48 and the upper side wall 14 of the respective cup holder assembly 10. As further shown in FIG. 4, in an arrangement with two cup holders 52 and 56, a single substrate portion 48 may be integrally formed with both respective first bodies 12 of the cup holder assemblies 10 used to define the first and second cup holders 52 and 56. Accordingly in an example, a single component can be used to define a portion of vehicle console 46 as well as the upper portions of adjacent cup holders 52 and 56. Other examples of vehicle console construction including one or more cup holders incorporating cup holder assembly 10 can be integrated into the vehicle console 46 by other arrangements, including first body 12 having respective upper side walls terminating in the area of open end 16 and separately affixed to one or more common or respective substrates, which may themselves be separate from or integral with vehicle console 46.

The above-described modular construction of cup holder assembly 10, including when used in connection with cup holders 52 and/or 56 in a vehicle console 46, can provide a reduction in tooling costs associated with the manufacture of cup holder components. In particular, a single set of tooling can be used for both illuminated 44 and non-illuminated 42 cup holder variations, while also providing a cup holder (such as cup holder 52, for example) that has a finished visual appearance when in the non-illuminated variation 42. This appearance is accomplished by coupling second body 20 with first body 12 in the first assembly position 28 such that there is no gap (such as gap 32 that is present in second assembly position 30) left empty by not including insert 34. Such a modular construction further allows for ease of manufacture, particularly in connection with vehicles in which illuminated cup holders, such as cup holders 52 and 56, are offered as an option, or are present only in certain vehicle trim-levels. This ease of manufacture is accomplished by allowing for first body 12 and second body 20, which may then be assembled in either the illuminated variation 44 or the non-illuminated variation 42, according to the specifications of the particular vehicle being assembled. As discussed above, one or more first bodies 12 may be integral with a single substrate 48, which, in turn, may be a part of the vehicle console 46 as discussed above.

Figure 5:
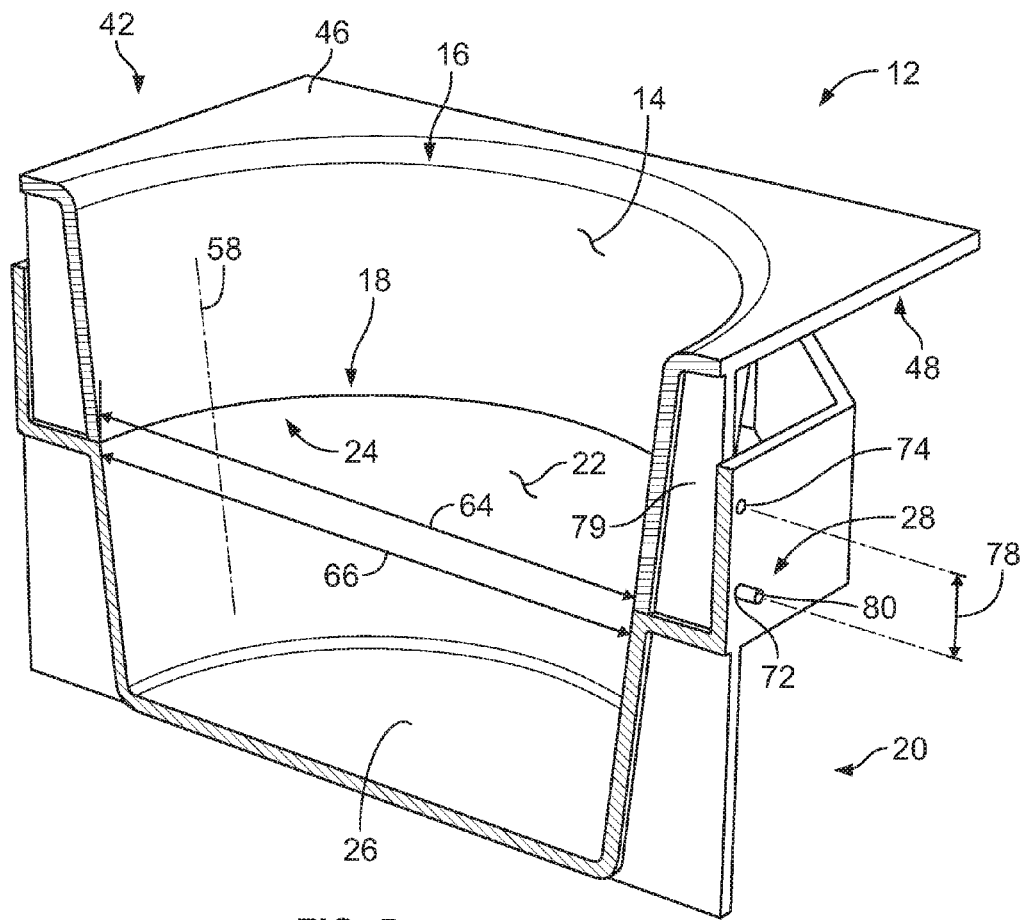
FIG. 5 is a cross-sectional perspective view of the cup holder in the assembly variation of FIG. 2.

The above-mentioned consistent visual appearance of cup holder assembly in both the non-illuminated variation 42 and the illuminated variation 44 can be facilitated by the construction of the first body 12, the second body 20, and the insert 34. In particular, the upper side wall 14 of first body 12 as well as the lower side wall 22 of second body 20 can both have a tapered construction so as to form conical sections, as shown in the cross-sectional view of FIG. 5. The conical sections can be such that, when second body 20 is assembled with first body 12 in the first assembly position 28, the upper side wall 14 and the lower side wall 22 align with each other along a consistent conical profile 58. In other words, the open end 18 of first body 12 can have a diameter 64 that is substantially equal to a diameter 66 of the open end 24 (such open ends 18 and 24 defining respective edges of the associated side walls 14 and 22) of second body 20 that is adjacent thereto when in the first assembly position 28. The respective upper 14 and lower 22 side walls can extend from the associated open ends 18 and 24 in opposite directions at substantially the same angle. Accordingly when cup holder assembly 10 is in the non-illuminated variation 42, as shown in FIG. 5, it has the appearance of a generally uniform or continuous interior defined by upper side wall 14 and lower side wall 22, extending along profile 58, with only a small parting line between the adjacent open ends 16 and 24 interrupting such profile 58.

Figure 6:
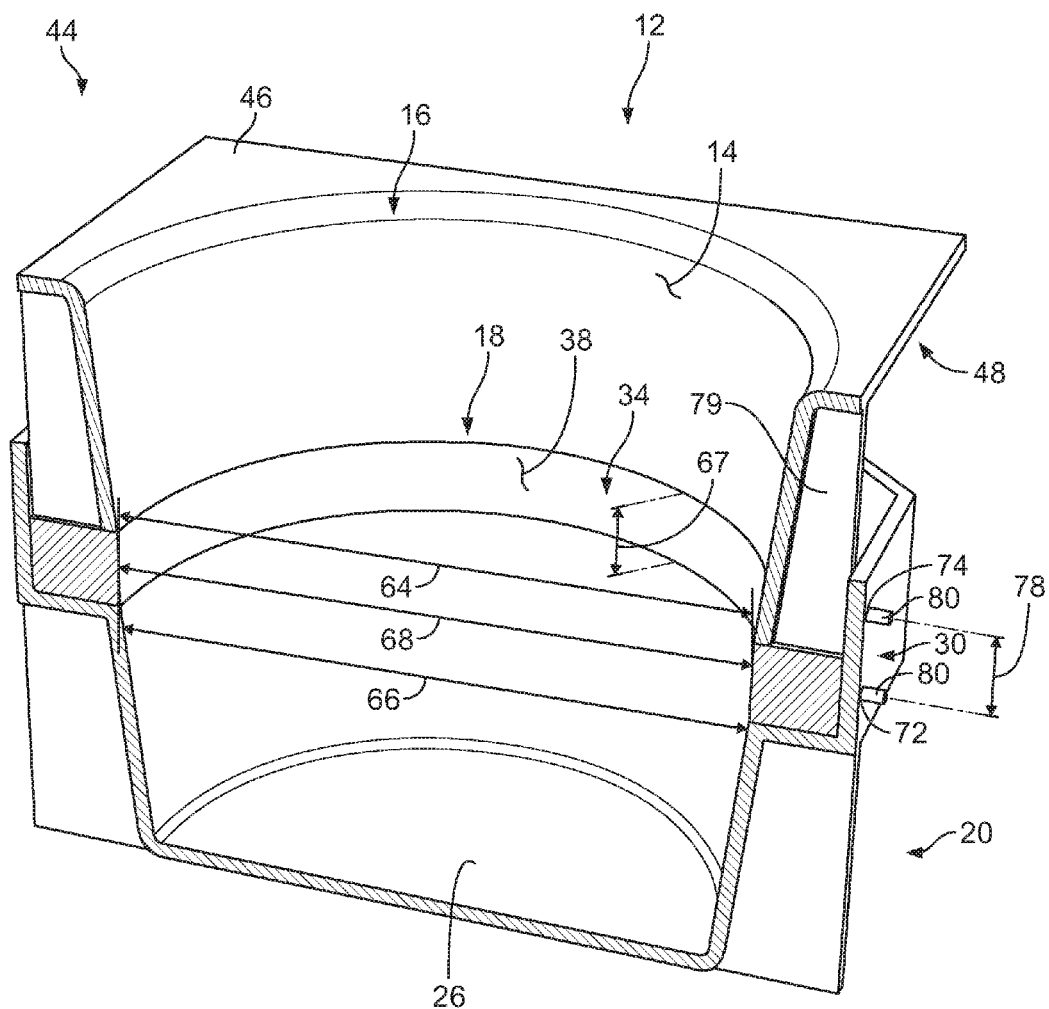
FIG. 6 is a cross-sectional perspective view of the cup holder in the assembly variation of FIG. 3.

First body 12, second body 20 and insert 34 are further constructed so as to provide a generally uniform appearance when cup holder assembly 10 is in the illuminated variation 44, as shown in FIG. 6. When second body 20 is assembled with first body 12 in the second assembly position 30, the conical profile 58, which uniformly extends over upper side wall 14 and lower side wall 22 in the non-illuminated variation 42, is interrupted by gap 32 when in the illuminated variation 44. To mitigate the visual effect of this interruption, insert body 36 can have a cylindrical construction so as to vertically extend between second open end 18 of first body 12 and third open end 24 of second body 20 so as to substantially fill gap 32. Insert body 36 is constructed with a diameter 68 that is substantially equal to the diameters 64 and 66 of open end 18 and open end 24. The generally vertical interior surface 38 of insert body 36, accordingly, extends between upper side wall 14 and lower side wall 22.

Although a consistent conical section is not achieved in such a construction, the height of gap 32 and the positioning thereof can reduce the visual effect of the interruption of gap 32 such that illuminated variation 44 of cup holder assembly 10 still provides a generally consistent and finished visual appearance therefor. In particular, the height 60 of upper side wall 14 and the height 62 of lower side wall 22 can be substantially equal, such that gap 32, and accordingly insert 34, are positioned about halfway vertically through the interior 41 of illuminated variation 44 of cup holder assembly 10. In other examples the height 60 of upper side wall 14 can be greater than the height 62 of lower side wall 22 such that insert 34 is positioned at least half way, in the vertical direction, through the interior 41 of the illuminated variation 44 of the cup holder assembly 10. Additionally, gap 32 can be configured such that insert 34 has a height 67 of less than about 10 mm, and in one embodiment between about 5 mm and 10 mm. In general, by positioning gap 32 closer to lower wall 26 than open end 16 a greater height 67 of insert 34 may be permitted while achieving a similarly unnoticeable disruption in the continuity of the interior 41 of illuminated variation 44 of cup holder assembly 10.

To facilitate the attachment of second body 20 with first body 12 in either the first assembly position 28 or the second assembly position 30, first body 12 and second body 2 can include a plurality of various, appropriately positioned, attachment features. Specifically, as shown in FIGS. 1, 5, and 6, second body 20 can include a first set of attachment features 72 positioned along the portion thereof, and first body 12 can include another set of attachment features 78 along corresponding portions thereof. In the example shown in FIG. 1, attachment features 78 are included on ribs 79, which are integrally formed on an interior 41 of first body 12, although other locations are possible. Further, attachment features 78 are in the form of blind holes, which may be threaded so as to receive screws or the like. Attachment features 72 can be in the form of through holes that extend entirely through a corresponding portion of second body 20 such that fasteners 80, which can be in the form of screws or the like, can pass through attachment features 72 and engage with attachment features 78 to retain second body 20 with first body 12. Attachment features 72 and 78 can be respectively positioned along second body 20 and first body 12 such that, when aligned and secured with a fastener 80 second body 20 is affixed with first body 12 in the first assembly position 28, as described above and shown in FIGS. 2 and 5.

Second body 20 can further include a second set of attachment features 74 positioned so as to be generally aligned with attachment features 72 and spaced apart therefrom a distance 76, which corresponds to the vertical heights of insert body 36 and gap 32. Accordingly, as shown in FIG. 6, second body 20 can be affixed with first body 12 in the second assembly position 30 by aligning attachment features 74 in second body 20 with attachment features 78 on first body 12 using fasteners 80, as shown in FIG. 6. Because of the aforementioned spacing between attachment features 72 and 74, the attachment of second body 20 with first body 12 is such that second body 20 is in the second assembly position 30. Prior to such assembly of second body 20 with first body 12, insert body 36 can be affixed with second body 20, for example, by aligning respective ones of a set of attachment features 81 formed on insert body 36 with first attachment features 72 of second body 20, and by securing insert body 36 with second body 20 using additional fasteners 80, as shown in FIG. 6. Accordingly, subsequent attachment of second body 20, having been assembled with insert body 36, can be attached with first body 12 in the second assembly position 30 to achieve the illuminated variation 44 of cup holder assembly 10, as shown in FIGS. 3 and 6. Additionally or alternatively, it may be possible to secure insert body 36 within gap 32 without the use of additional fasteners, simply by the attachment of second body 20 with first body 12 and the corresponding fit of insert body 36 within gap 32. Still further variations in the various positioning of the attachment features described herein are possible which would achieve similar alignment of the various components of cup holder assembly 10, as described herein. This can include variations in the relative proportions of the components, such as second body 20, first body 12, and insert 34, which can for example, vary the location and size of insert 34 within the illuminated variation 44 of cup holder assembly 10.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

We claim:

1. A cup holder assembly, comprising:
   a first body defining an upper sidewall between a first open end and a second open end;
   a second body defining a lower sidewall between a third open end and a lower wall, and affixable with the first body in a first position with the lower sidewall extending continuously with the upper sidewall and a second position with a gap defined between the upper sidewall and the lower sidewall; and
   an insert positionable within the gap when the second body is assembled with the first body in the second position.

2. The cup holder assembly of claim 1, wherein the upper sidewall and the lower sidewall are tapered such that when the second body is assembled with the first body in the first position, the upper sidewall and lower sidewall together define a conical section.

3. The cup holder assembly of claim 1, wherein:
   the second open end and the third open end are of a generally equal diameter; and
   the insert defines a cylindrical interior surface that aligns between the second open end and the third open end when the second body is assembled with the first body in the second position and the insert is positioned within the gap.

4. The cup holder assembly of claim 1, wherein the insert comprises an at least partially transparent material.

5. The cup holder assembly of claim 4, wherein the insert includes a body and a light source, the body comprising the at least partially transparent material and defining a light path for dispersing light from the light source into an interior of the cup holder assembly.

6. The cup holder assembly of claim 1, wherein the upper sidewall has a first height and the lower sidewall has a second height, the first height being substantially equal to the second height.

7. The cup holder assembly of claim 1, wherein:
   the second body includes a first set of attachment features and a second set of attachment features spaced apart at a distance about equal to a distance of the gap;
   the first body includes a third set of attachment features; and
   the second body is affixable with the first body in the first position by coupling the first set of attachment features with the third attachment features and is affixable in the second position by coupling the second set of attachment features with the third attachment features.

8. The cup holder assembly of claim 7, further comprising an insert including a fourth set of attachment features and positionable within the gap when the second body is assembled with the first body in the second position, the insert being affixable with the first and second bodies by coupling the fourth attachment features with the second attachment features.

9. A vehicle console, comprising:
   a substrate; and
   a cup holder, including
      a first body defining an upper sidewall between the substrate and a first edge; and
      a second body defining a lower sidewall between a second edge and a lower wall and affixable with the first body in a first position with the second edge contacting the first edge and a second position with a gap defined between the first edge and the second edge.

10. The vehicle console of claim 9, wherein the first body is coupled with the substrate, an opening being defined along an intersection between the first body and the substrate.

11. The vehicle console of claim 9, wherein the first body is integrally formed with the substrate.

12. The vehicle console of claim 9, wherein the cup holder further includes an insert positionable within the gap when the second body is assembled with the first body in the second position.

13. The vehicle console of claim 12, wherein the insert is of an at least partially transparent material.

14. The vehicle console of claim 13, wherein the cup holder further includes a light source positioned on an interior side of the substrate, the insert defining a light path for dispersing light from the light source into a cup holder interior defined by the assembled first body, second body and insert.

15. The vehicle console of claim 9, wherein the cup holder is a first cup holder, the vehicle console further comprising a second cup holder, including:
   a third body defining an upper sidewall between the substrate and a first edge thereof; and
   a fourth body defining a lower sidewall between a second edge and a lower wall thereof, and affixable with the third body in a first position with the second edge contacting the first edge and a second position with a gap defined between the first edge and the second edge;
   wherein assembly of the first body with the second body defines a first cup holder interior and assembly of the third cup body with the fourth body defines a second cup holder interior.

16. A modular cup holder system, comprising:
   a first body defining an upper sidewall between an opening and a first edge; and
   a second body defining a lower sidewall between a second edge and a lower wall, and affixable with the first body in a first position with the second edge contacting the first edge and a second position with a gap defined between the first edge and the second edge; and
   an insert positionable within the gap when the second body is assembled with the first body in the second position.

17. The modular cup holder system of claim 16, wherein:
   the first edge and the second edges are of generally equal diameters; and
   the insert defines a cylindrical interior surface that aligns between the first edge and the second edge when the second body is assembled with the first body in the second position and the insert is positioned within the gap.

18. The modular cup holder system of claim 16, wherein the insert comprises an at least partially transparent material.

19. The modular cup holder system of claim 18, wherein the insert includes a body and a light source, the body comprising the at least partially transparent material and defining a light path for dispersing light from the light source into an interior of the cup holder assembly when the insert is assembled with the first and second cup holder portions.

* * * * *